US009554169B2

(12) United States Patent
Shrum, Jr. et al.

(10) Patent No.: US 9,554,169 B2
(45) Date of Patent: Jan. 24, 2017

(54) SYSTEMS, METHODS, AND APPARATUS FOR DELIVERING CONTENT

(71) Applicant: COX COMMUNICATIONS, INC., Atlanta, GA (US)

(72) Inventors: Edgar V. Shrum, Jr., Atlanta, GA (US); Francisco Gonzalez, Atlanta, GA (US); John Civiletto, Atlanta, GA (US); Steve Watkins, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/551,694

(22) Filed: Nov. 24, 2014

(65) Prior Publication Data

US 2015/0106839 A1    Apr. 16, 2015

Related U.S. Application Data

(63) Continuation of application No. 13/553,325, filed on Jul. 19, 2012, now Pat. No. 8,898,692.

(51) Int. Cl.
*H04N 7/167* (2011.01)
*H04N 21/258* (2011.01)
*H04N 21/2668* (2011.01)
*H04N 21/45* (2011.01)
*H04N 21/2347* (2011.01)
*H04N 21/254* (2011.01)

(52) U.S. Cl.
CPC .... *H04N 21/25816* (2013.01); *H04N 21/2347* (2013.01); *H04N 21/2541* (2013.01); *H04N 21/25841* (2013.01); *H04N 21/2668* (2013.01); *H04N 21/4524* (2013.01)

(58) Field of Classification Search
CPC ........... H04N 21/2347; H04N 21/2541; H04N 21/25841; H04N 21/2668; H04N 21/4524; H04N 7/173
USPC .................................. 725/25, 31, 87, 91, 93
See application file for complete search history.

(56) References Cited

U.S. PATENT DOCUMENTS

2010/0049810 A1*  2/2010  Maeda ............... H04N 1/00132
                                                  709/206
2012/0124612 A1*  5/2012  Adimatyam ..... H04N 21/25841
                                                  725/27

* cited by examiner

Primary Examiner — Oleg Asanbayev
(74) Attorney, Agent, or Firm — Sutherland Asbill & Brennan LLP

(57) ABSTRACT

Systems, methods, and apparatus for delivering content are provided. A request for desired content may be received by a content management server from a customer device associated with a customer. The content management server may include one or more computers. Additionally, the content management server may determine whether the customer device is in communication with one or more additional devices associated with the customer. Based at least in part upon the communication determination, the content management server may determine whether the customer device is located within a subscription area for the customer. Based at least in part upon the determination of whether the customer device is located within the subscription area, the content management server may determine access rights to the desired content.

16 Claims, 7 Drawing Sheets

SYSTEMS, METHODS, AND APPARATUS FOR DELIVERING CONTENT

CROSS-REFERENCE TO RELATED APPLICATION

This application is a continuation of U.S. patent application Ser. No. 13/553,325, filed Jul. 19, 2012, which is hereby incorporated herein by reference in its entirety.

TECHNICAL FIELD

Aspects of the invention relate generally to the delivery of content, and more particularly, to the delivery of content based upon a determined location or likely location of a customer device.

BACKGROUND

A wide variety of service providers, such as cable providers and satellite providers, provide broadband communications services, such as television services, to customers. In a typical distribution of content, a service provider outputs content that is received and processed by an authenticated access device, such as a cable set-top box, a satellite set-top box, or a cable modem. A service provider can infer with relatively high certainty that these authenticated access devices are situated within a household or other location tied to a customer account. These inferences allow the service provider to satisfy distribution requirements of various content providers.

However, with the introduction of additional types of devices that may be configured to receive content, such as tablets, mobile devices, and/or personal computers, it becomes more difficult for a service provider to infer that a device is situated within a household. The service provider may wish to allow customers to use a wide variety of different device types within a household, thereby enhancing the customer experience and improving customer satisfaction. However, for various reasons, such as content distribution requirements, the service provider may desire to limit content access for customer devices situated outside of the household. Accordingly, improved systems, methods, and apparatus for delivering content based upon a determined location or likely location of customer device are desirable.

BRIEF DESCRIPTION

Some or all of the above needs and/or problems may be addressed by certain embodiments of the invention. Embodiments of the invention may include systems, methods, and apparatus for delivering content. In one embodiment, a method for delivering content may be provided. A request for desired content may be received by a content management server from a customer device associated with a customer. The content management server may include one or more computers. Additionally, the content management server may determine whether the customer device is in communication with one or more additional devices associated with the customer. Based at least in part upon the communication determination, the content management server may determine whether the customer device is located within a subscription area for the customer. Based at least in part upon the determination of whether the customer device is located within the subscription area, the content management server may determine access rights to the desired content.

In accordance with another embodiment of the invention, a system for managing content delivery may be provided. The system may include at least one memory and at least one processor. The at least one memory may be configured to store computer-executable instructions. The at least one processor may be configured to access the at least one memory and execute the computer-executable instructions to: receive, from a customer device associated with a customer, a request for desired content; determine whether the customer device is in communication with one or more additional devices associated with the customer; determine, based at least in part upon the communication determination, whether the customer device is located within a subscription area for the customer; and determine, based at least in part upon the determination of whether the customer device is located within the subscription area, access rights to the desired content.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
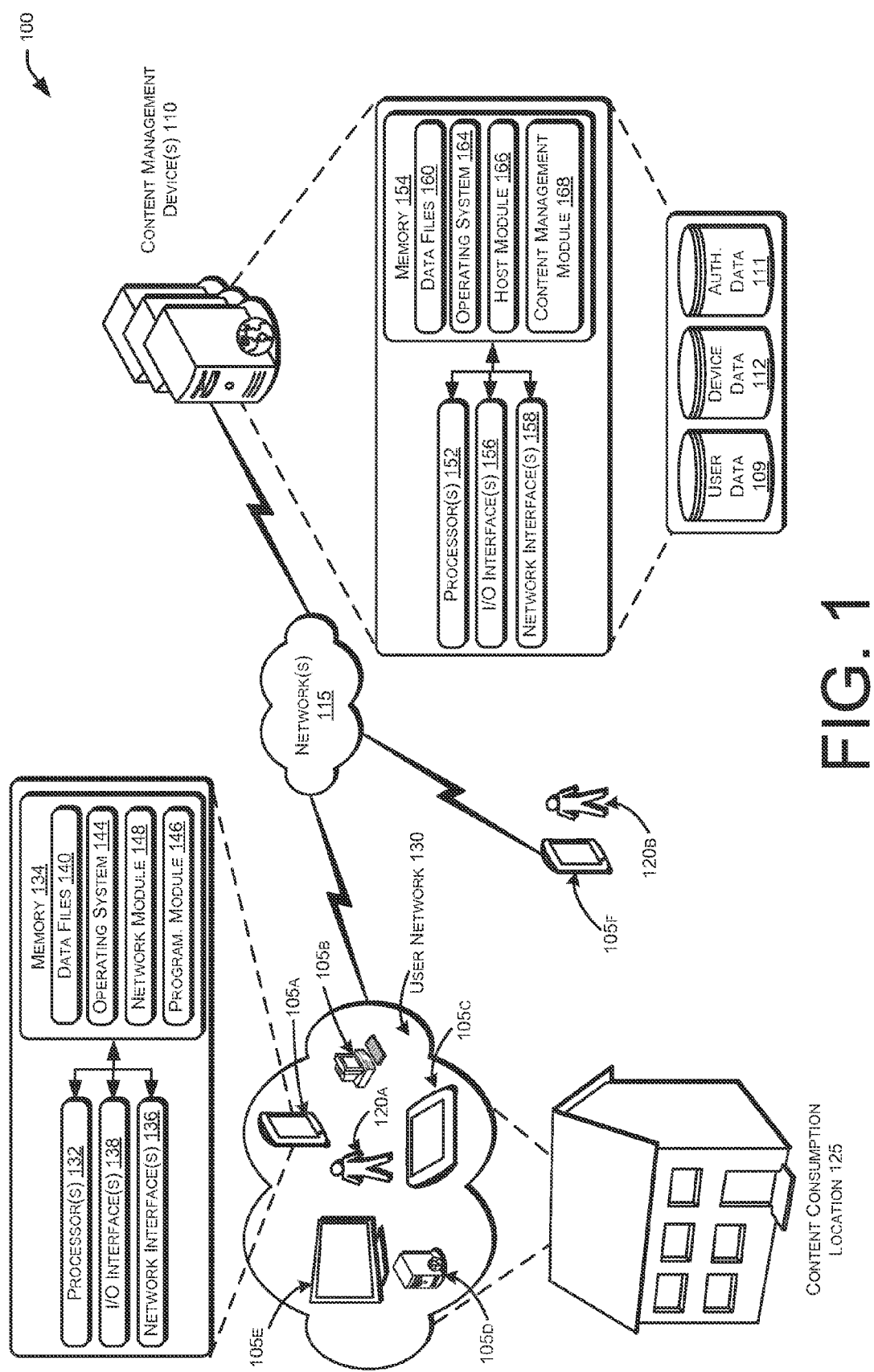
FIG. 1 illustrates a block diagram of an example system that may be utilized to facilitate the delivery of content, according to an illustrative embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

For purposes of this disclosure, the term "subscription area" may refer to a designated area in which content may be provided to a customer in accordance with the general terms of a customer's subscription or account with a service provider. One example of a subscription area includes the area associated with a household of a customer (e.g., the area inside of and around a customer's home, etc.); however, other example subscription areas will be appreciated. For customer devices determined to be situated within the subscription area, access rights may be determined in accordance with the customer's subscription or account. For example, content included in a subscription plan may be provided to the customer devices. For customer devices determined to be situated outside of the subscription area, access rights may be determined in accordance with the customer's subscription and in accordance with at least one other parameter or criteria, such as content provider and/or service provider parameters. For example, access to content may be restricted or limited (e.g., lower quality content, etc.). As another example, a customer may be required to provide authentication information in order to receive access to content. A wide variety of different control actions may be taken by a service provider in response to a determination that a customer device is situated outside or likely situated outside of the subscription area.

For purposes of this disclosure, the term "mesh fingerprint" may refer to a customer device profile with respect to one or more additional devices in communication with the customer device. A wide variety of information may be included in a mesh fingerprint as desired in various embodiments of the invention, including but not limited to, identifiers of one or more additional devices in communication with the customer device, network addresses (e.g., Internet Protocol addresses, etc.) of the one or more additional devices, and/or information associated with services provided or hosted by the one or more additional devices. Additionally, the use of the term "mesh fingerprint" does not necessarily mean that a mesh network is utilized to facilitate communication between customer devices; however, one or more mesh networks may be utilized in certain embodiments.

Embodiments of the invention may include systems, methods, and apparatus for delivering content to customer devices. In certain embodiments, a content management device or system, such as a content management server associated with a content service provider (e.g., a cable service provider, a satellite service provider, etc.), may receive a request for desired content. The request may be received from a customer device associated with a customer of the content service provider. According to an aspect of the invention, the request may be received from a customer device that is not a primary device (e.g., a broadband modem, a set-top box, a gateway device, etc.) associated with a customer account for the customer with the content service provider. For example, the request may be received from any number of secondary devices associated with the customer, such as a tablet computer, a mobile device, or a personal computer. A wide variety of suitable networks may facilitate communication between a secondary customer device and the content management server, such as the Internet, a cellular network, a cable network, and/or any other suitable network or combination of networks.

Once a request for desired content is received, the content management server may process the request and determine access rights to the desired content for the requesting customer device (i.e., the requesting secondary device). According to an aspect of the invention, the content management server may determine access rights based at least in part upon a location determination associated with the customer device. In certain embodiments, the content management server may determine whether the customer device is in communication with one or more additional devices associated with the customer, such as one or more additional customer devices. Based at least in part upon the determination of whether the customer device is in communication with one or more additional devices, the content management server may determine whether the customer device is located within or likely located within a subscription area for the customer. The content management server may then determine access rights based at least in part upon the determination of whether the customer device is located within or likely located within the subscription area. For example, in the event that the customer device is determined to be located within the subscription area, the content management server may permit access to the desired content. As another example, in the event that the customer device is determined to be located outside of the subscription area, the content management server may prohibit access to the desired content, permit access to only a portion or limited version of the desired content, or request authentication information from the customer prior to permitting access to the content.

A wide variety of suitable methods and/or techniques may be utilized to facilitate a determination of whether a requesting customer device is located within or likely located within a subscription area for the customer. As one example, a determination may be made as to whether the customer device is connected to the content management server via an authenticated access point, such as an authenticated gateway device or authenticated broadband modem. As desired, a network hop count and/or a network latency between the customer device and the authenticated access point may be evaluated in order to evaluate the communication between the customer device and the authenticated access point. As another example, a determination may be made as to whether an additional customer device (e.g., a gateway device, a broadband modem, etc.) has authenticated the customer device. As yet another example, a mesh fingerprint may be determined for the customer device, and the mesh fingerprint may be evaluated in order to determine whether the customer device is located within or likely located within the subscription area. As yet another example, a profile of the customer device and/or characteristics of the customer device may be determined, and the profile may be evaluated in order to determine a likely nature or type associated with the customer device. The nature or type may then be evaluated in order to determine whether the customer device is located within or likely located within the subscription area. A wide variety of other suitable evaluation techniques may also be utilized. Additionally, as desired, a plurality of evaluation techniques may be combined.

System Overview

An example system 100 for facilitating the delivery of content will now be described illustratively with respect to FIG. 1. The system 100 may include, for example, any number of customer devices 105A-F and/or one or more content management devices 110 or content management servers that are associated with a service provider (e.g., a cable service provider, a satellite service provider, etc.). The customer devices 105A-F may include any suitable devices that facilitate the access, receipt and/or processing of content output by the service provider, such as one or more mobile devices 105A, 105F, a personal computer 105B, a tablet computer 105C, and/or one or more suitable programming processing components and/or authenticated access points (e.g., a set-top box 105D, a virtual set-top box 105E integrated into a television or display device, a broadband modem, a gateway device, etc.). Any number of suitable networks 115 may facilitate communications between the customer devices 105A-F and the content management devices 110. As desired, one or more components of the system 100 may be processor-driven components or devices. Additionally, in certain embodiments, certain components of the system 100 may be combined.

With reference to FIG. 1, any number of customer devices, such as devices 105A-F, may be provided. Certain customer devices, such as a programming processing component, a set-top box, or a broadband modem, may be primary devices that are recognized by the service provider and/or the content management devices 110. As desired, these customer devices may form authenticated access points that are recognized by the content management devices 110. Additionally, in certain embodiments, the content management devices 110 may assume that the primary devices are situated within a subscription area associated with the customer, such as a subscription area associated with a household or other suitable content consumption location 125.

Other customer devices, such as the illustrated mobile devices 105A, 105F, the personal computer 105B, and/or the tablet computer 105C, may be secondary devices configured to receive and process content output by the service provider. In certain embodiments, the secondary devices may be devices that are not authenticated access points recognized by the content management devices 110. Additionally, in certain embodiments, the secondary devices may provide additional outlets for customers of the service provider to receive and/or view content. For example, a customer 120A of a cable service provider may utilize a primary device, such as a cable set-top box, as a primary outlet for receiving content, and the customer 120A may utilize a secondary device, such as a mobile device 105A or tablet 105C, as a secondary outlet for receiving content.

As illustrated in FIG. 1, any number of users or customers 120A, 120B may be associated with the customer devices 105A-F. Additionally, any number of user networks 130 or customer networks may be utilized to facilitate communication between various customer devices. For example, a suitable wireless network may facilitate communication between a tablet computer 105C and a suitable router device connected to and/or integrated with a broadband modem or other authenticated access point. As another example, suitable wired networks and/or home area networks may facilitate communication between various customer devices. According to an aspect of the invention, a customer device located within the subscription area may be in communication with any number of additional customer devices located within the subscription area.

In certain embodiments, a secondary device, such as a mobile device 105F, may be utilized outside of the subscription area in an attempt to request and receive content from the service provider. For example, a customer 120B that is away from the content consumption location 125 may utilize a mobile device 105F (or other customer device) to request content from one or more content management devices 110 via one or more suitable networks 115. According to an aspect of the invention, the content management devices 110 may determine that the mobile device 105F is situated outside of or is likely situated outside of the subscription area. The content management devices 110 may then control access to the requested content based at least in part upon the location determination. For example, the content management devices 110 may prevent the delivery of the requested content, limit the scope of the content provided, or request authentication credentials (e.g., a user name and password, etc.) from the customer 120B prior to delivering content.

An example customer device (referred to herein as customer device 105) will now be described. The customer device 105 may be a suitable processor-driven device that facilitates the receipt, processing, presentation, and/or output of content. In certain embodiments, the content may be included in a broadband data signal. In other embodiments, the content may be received via one or more other types of communications signals, such as communications signals transmitted via a cellular network, the Internet, or other suitable network. Additionally, the customer device 105 may be a suitable processor-driven device that facilitates the receipt and processing of customer or user commands to receive desired content. As such, the customer device 105 may include any number of computing devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the customer device 105 may form a special purpose computer or other particular machine that is operable to facilitate the processing of requests for desired content and/or the processing and display of received content.

With reference to FIG. 1, the customer device 105 may include one or more processors 132, one or more memory devices 134, one or more transceivers and/or network interfaces 136, and/or one or more input/output ("I/O") interfaces 138. The processors 132 may be configured to execute any number of software applications and/or computer-readable or computer-executable instructions. The memory devices 134 may include any number of suitable memory devices, such as caches, read-only memory devices, random access memory devices, flash memory devices, magnetic storage devices, removable storage devices (e.g., memory cards, etc.), and/or other memory devices. The memory devices 134 may include internal memory devices and/or external memory devices in communication with the customer device 105. The memory devices 134 may store data, executable instructions, and/or various program modules utilized by the processors 132. Examples of data that may be stored by the memory devices 134 include data files 140 and/or any number of suitable program modules that may be executed by the processors 132, such as an operating system ("OS") 144, a network module 148, and/or a programming module 146.

The data files 140 may include any suitable data that facilitates the operation of the customer device 105, the processing of a received content, the receipt of content requests, the processing of content requests, and/or communication with one or more additional customer devices. For example, the data files 140 may include, but are not limited to, user profile information, device profile information, information associated with available content (e.g., program guide information, etc.), information associated with additional customer devices (e.g., Internet Protocol addresses, device names, etc.), and/or information associated with the content management devices and/or the service provider.

The OS 144 may be a suitable software module that controls the general operation of the customer device 105. The OS 144 may also facilitate the execution of other software modules, for example, the network module 148 and/or the programming module 146. As desired, the customer device 105 may include an interactive program guide ("IPG") module or application that processes program guide information received by the customer device 105. For example, electronic program guide ("EPG") information may be included in data received by the customer device 105. The IPG module may format at least a portion of the received EPG data for presentation to a customer via an IPG grid. For example, received EPG data may be parsed and organized by channel and time slot. The organized data may then be formatted for display in an IPG grid. Once presented, a customer may navigate through a displayed IPG grid in order to view scheduled content, such as current and upcoming television content. As desired, the customer may utilize the IPG grid to request the receipt or delivery of desired content. For example, the user may select an individual entry included in the grid, and the user may request that the content associated with the grid entry be delivered to the customer device 105. As an alternative to selecting data from an IPG grid via an IPG module, a customer may utilize a suitable browser application to access one or more Web pages or other graphical user interfaces hosted by the content management devices 110 that include information associated with available content. The customer may then select desired content from the available graphical user interfaces. As another alternative, a suitable dedicated application may be executed by the customer device 105 to facilitate the preview and selection of desired content. Alternatively, the programming module 146 may include functionality that allows desired content to be selected. Indeed, a wide variety of suitable methods and/or techniques may facilitate the selection of desired content by a customer device 105.

The programming module 146 or programming application may be a suitable software module or application that facilitates the processing and/or output of received content. For example, the programming module 146 may be configured to format at least a portion of a received content item (e.g., a television program, video on-demand content, a movie, Internet content, etc.) for output by the customer device 105 and/or presentation to the customer. A wide variety of content may be formatted for output by the programming module 146 as desired in various embodiments of the invention including, but not limited to, television content, audio content, voice over Internet protocol ("VoIP") telephone content, electronic program guide data, Internet and/or Web site content, etc. Additionally, the programming module 146 may be configured to receive and process user or customer commands associated with the output of content. For example, the programming module 146 may be configured to process user commands received via one or more suitable input devices and/or user voice commands.

Additionally, the programming module 146 may be configured to process customer or user commands to receive the desired content item. In certain embodiments, a user command to receive desired content may be received via a user's interaction with an IPG grid. In other embodiments, a customer command to receive desired content may be received via one or more suitable I/O devices in communication with the programming module. Once a user command to receive desired content has been received, the programming module 146 may generate a request for the desired content, and the request may be communicated to the content management devices 110. A wide variety of information may be included in the request, such as an identifier of the customer device 105, an identifier of the desired content, an identifier of the user, customer account information associated with the user, and/or a wide variety of network connection information, such as information generated or determined by the network module 148. Following the communication of the request to the content management devices 110, the programming module 146 may receive one or more responses to the request. For example, the programming module 146 may receive an indication that the desired content is not available because the customer device 105 is not located within a subscription area. As another example, the programming module 146 may receive the desired content.

One example of the operations that may be performed by the programming module 146 is described in greater detail below with reference to FIG. 2.

The network module 148 may be a suitable software module or application that facilitates interaction between the customer device 105 and one or more additional customer devices, as well as the determination and/or generation of network connection information. In one example embodiment, the network module 148 may facilitate communication with additional customer devices via any number of suitable networks, such as the user networks 130. In this regard, the network module 148 may collect information associated with the additional customer devices, such as device identifiers, Internet Protocol ("IP") addresses, and/or characteristics of the additional devices (e.g., a list of one or more services provided by the additional devices). The network module 148 may facilitate communication with a wide variety of different types of additional devices, such as a broadband modem, a router, any number of secondary customer devices, a security system, a home area network management system, a power management system, and/or any other suitable device.

In certain embodiments, the network module 148 may facilitate the generation of a mesh fingerprint or a mesh profile for the customer device 105, and the mesh fingerprint may be communicated to the content management devices 110. Additionally, as desired, the network module 148 may facilitate the generation of a profile for the customer device 105, such as a profile that includes one or more characteristics associated with the customer device 105 (e.g., a device type, etc.). In certain embodiments, the network module 148 may additionally facilitate the authentication of the customer device 105 with an additional device, such as an authenticated access point. For example, the network module 148 may facilitate collection of authentication information from a customer and/or the communication of at least a portion of collected and/or stored authentication information to an additional device.

One example of the operations that may be performed by the network module 148 is described in greater detail below with reference to FIG. 2.

With continued reference to the customer device 105, the one or more I/O interfaces 138 may facilitate communication between the customer device 105 and one or more input/output devices, for example, one or more user interface devices, such as a remote control, display, keypad, mouse, pointing device, control panel, touch screen display, microphone, speaker, etc., that facilitate user interaction with the customer device 105. In this regard, user commands may be received by the customer device 105, and received content may be output. The one or more network interfaces 136 may facilitate connection of the customer device 105 to one or more suitable networks, such as networks 115 and/or user networks 130. The networks 115, 130 may include any number of service provider networks or broadband networks (e.g., a cable network or a satellite network), wide area networks (e.g., a cellular network, the Internet, etc.) and/or local area networks (e.g., a Bluetooth-enabled network, a Wi-Fi enabled network, etc.). In this regard, the customer device 105 may receive desired content for processing and output. Additionally, the customer device 105 may communicate commands and/or requests to the content management devices 110, and the customer device 105 may receive commands and/or information from the content management devices 110.

The example customer device 105 described above is illustrated as a mobile device; however, it will be appreciated that other customer devices may include similar components. As desired, other customer devices may include one or more other components in addition to those described. For example, a programming processing component, such as a set-top box or a broadband modem, may include a suitable broadband interface that facilitates connection of the programming processing component to a broadband network, such as a cable network or a satellite network. Examples of suitable programming processing components include, but are not limited to, a set-top box ("STB") (e.g., a cable STB, a digital satellite STB, an Internet Protocol Television STB, etc.), a virtual STB, an embedded STB, etc. In certain embodiments, a programming processing component may be connected to one or more display devices, such as a television, associated with a customer. In other embodiments, the programming processing component may be embedded, incorporated into, and/or executed on the display device. In operation, a programming processing component may receive at least a portion of a broadband data signal output by a service provider, and the programming processing component may convert at least a portion of the received signal into content which is displayed or otherwise output by the display device.

As desired, the broadband signal provided to the programming processing component may include a wide variety of data components, including but not limited to, a television signal, a digital television signal, data associated with a VoIP telephone service, data associated with Internet service, data associated with home monitoring services, etc. The programming processing component may receive and process the broadband signal. As desired, the programming processing component may selectively output a portion of the broadband signal, such as digital television data (e.g., audio and/or video data), electronic program guide data, various Web pages, etc., to the display device for display. Additionally, in certain embodiments, the programming processing component may output audio data to any number of audio components, such as a home theater system, stereo system, etc.

In certain embodiments, a programming processing component may form an authenticated access point. As such, the programming processing component may authenticate other customer devices (e.g., a mobile device 105A, a personal computer 105B, a tablet computer 105C, etc.). For example, a secondary customer device may connect to the content management devices 110 through the programming processing component. As another example, authentication information for a secondary device may be stored on a programming processing component, and the programming processing component may utilize at least a portion of the authentication information to authenticate a secondary device and/or a connection formed between the programming processing component and the secondary device. The results of the authentication process may then be provided to the content management devices 110.

With continued reference to FIG. 1, any number of content management devices and/or systems 110 may be provided. In certain embodiments, the content management devices 110 may be associated with a suitable service provider, such as a cable service provider, a satellite service provider, or another service provider. The content management devices 110 may include any number of systems and/or devices that control the output of content for receipt by the customer devices 105A-F. In certain embodiments, the content management devices 110 may control the output of content and/or access rights to content based at least in part upon a determination as to whether a requesting customer device is located in or likely located within a subscription area for the customer. In operation, the content management devices 110 may identify content received from one or more content providers, format the content for output to a customer device via any number of appropriate signals (e.g., a broadband signal, a packet-switched signal, etc.) and/or control the provision of content to customer devices 105A-F. As desired, any number of suitable service provider systems may be associated with the content management devices 110, including but not limited to, a service provider head-end component, any number of encryption devices, an electronic program guide data server, an on-demand server, a pay-per-view purchase server, etc.

A content management device 110 may be a suitable processor-driven device configured to receive and process requests to receive desired content. Examples of suitable processor-driven devices that may be utilized as a content management device 110 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the content management device 110 may form a special purpose computer or other particular machine that is operable to facilitate the receipt of requests to receive desired content items, the processing of received requests, the determination of access rights to the desired content, and/or the selective distribution of the desired content.

In addition to one or more processors 152, the content management device 110 may include one or more memory devices 154, one or more input/output ("I/O") interfaces 156, and/or one or more network interfaces 158. The processors 152 may be configured to execute any number of software applications and/or computer-readable or computer-executable instructions. The memory devices 154 may include any number of suitable memory devices, such as caches, read-only memory devices, random access memory devices, flash memory devices, magnetic storage devices, etc. The memory devices 154 may store data, executable instructions, and/or various program modules utilized by the processors 152. Examples of data that may be stored by the memory devices 154 include data files 160 and/or any number of suitable data repositories (e.g., databases, etc.), such as a user data database 109, a customer device data database 112, and/or an authentication data database 111. Additionally, the memory devices 154 may be configured to store any number of suitable program modules and/or applications that may be executed by the processors 152, such as an operating system ("OS") 164, one or more host modules 166, and/or a content management module 168.

The data files 160 may include any suitable data that facilitates the operation of the content management device 110, the receipt of content requests, the processing of content requests, and/or the control of access rights to desired content. For example, the data files 160 may include, but are not limited to, information that facilitates communication with any number of customer devices 105A-F, information associated with received requests for desired content, customer information, customer access rights and/or subscription information, customer device information, customer subscription area information, data that facilitates the determination of a location or likely location of customer devices, and/or content provider and/or service provider rules associated with access to content. The user data database 109 may include a wide variety of data associated with customers of the service provider, such as a customer name, a customer address, a customer account number, customer access control parameters (e.g., parental controls, etc.), a customer profile, identifiers of customer devices, and/or information associated with a customer subscription area. The device data database 112 may include a wide variety of data associated with various customer devices, such as device identifiers, device characteristics, device capabilities, device profiles, mesh fingerprint information, and/or information associated with connections and/or communications between the devices. The authentication data database 111 may include a wide variety of information that may be utilized to authenticate customers and/or customer devices, including but not limited to, user names and passwords, digital authentication certificates, authentication keys, and/or dynamically generated authentication information. In certain embodiments, the authentication information may include information associated with one or more additional devices that may be utilized to authenticate a customer device, such as identification information for a customer device and an additional device, an indicator of the authentication relationship, and/or the respective authentication data stored on the relevant devices. Any number of suitable databases and/or data repositories may be utilized as desired in various embodiments of the invention, and the described databases are provided by way of example only.

The OS 164 may be a suitable software module that controls the general operation of the content management device 110. The OS 164 may also facilitate the execution of other software modules by the processors 152, for example, the one or more host modules 166 and/or the content management module 168. The one or more host modules 166 may be suitable software modules that facilitate the establishment of a communications session with one or more customer devices 105A-F. In this regard, the content management device 110 may receive one or more requests for desired content, and the content management device 110 may output desired content and/or messages associated with the processing of requests. For example, content requests may be received over a service provider network (e.g., a cable network, a satellite network, etc.) from a content management device 110 via a communications session established by a host module 166. As another example, a host module 166 may facilitate the establishment of a network session, such as a Web-based network session, with a customer device. During the established network session, a user request for desired content may be received from the customer device. Indeed, a wide variety of suitable communications techniques and/or connections may be established between the content management device 110 and one or more customer devices 105A-F via the host modules 166.

The content management module 168 may be a suitable software module or application that facilitates a determination of access rights to requested or desired content. In operation, once a request for desired content is received, the content management module 168 may process the request and determine access rights to the desired content for the requesting customer device. According to an aspect of the invention, the content management module 168 may determine access rights based at least in part upon a location determination associated with the requesting customer device. For example, the content management module 168 may determine whether the requesting customer device is a primary device or an authenticated access point, such as a registered broadband modem, a registered gateway device, or a registered set-top box. In the event that the requesting device is a primary device, then the content management module 168 may determine access rights in accordance with a customer subscription with the service provider.

As another example, in the event that the requesting device is not a primary device (i.e., the requesting device is a secondary device), the content management module 168 may determine whether the requesting customer device is in communication with one or more additional devices associated with the customer, such as one or more additional customer devices. Based at least in part upon the determination of whether the customer device is in communication with one or more additional devices, the content management module 168 may determine whether the customer device is located within or likely located within a subscription area for the customer. The content management module 168 may then determine access rights based at least in part upon the determination of whether the customer device is located within or likely located within the subscription area. For example, in the event that the customer device is determined to be located within the subscription area, the content management module 168 may permit access to the desired content in accordance with a customer subscription. As another example, in the event that the customer device is determined to be located outside of the subscription area, the content management module 168 may prohibit access to the desired content, permit access to only a portion or limited version of the desired content, or request authentication information from the customer prior to permitting access to the content.

A wide variety of suitable methods and/or techniques may be utilized to facilitate a determination of whether a requesting customer device is located within or likely located within a subscription area for the customer. As one example, a determination may be made as to whether the customer device is connected to the content management module 168 or a head end device associated with the service provider via an authenticated access point, such as an authenticated gateway device or authenticated broadband modem. As desired, a network hop count and/or a network latency between the customer device and the authenticated access point may be evaluated in order to determine whether a customer is likely attempting to access the authenticated access point from a location remote to the subscription area. As another example, a determination may be made as to whether an additional customer device (e.g., a gateway device, a broadband modem, etc.) has authenticated the customer device. As yet another example, a mesh fingerprint may be determined for the customer device, and the mesh fingerprint may be evaluated in order to determine whether the customer device is located within or likely located within the subscription area. As yet another example, a profile of the customer device and/or characteristics of the customer device may be determined, and the profile may be evaluated in order to determine a likely nature or type associated with the customer device. The nature or type may then be evaluated in order to determine whether the customer device is located within or likely located within the subscription area. A wide variety of other suitable evaluation techniques may also be utilized. Additionally, as desired, a plurality of evaluation techniques may be combined. Additionally, in certain embodiments, the results of one or more evaluation techniques may be utilized to generate, determine, or calculate a probability that the customer device is located within the subscription area. For example, a probability or confidence score may be calculated, and the probability score may be compared to one or more suitable threshold values in order to determine whether the customer device is likely located within the subscription area.

A few examples of the operations that may be performed by the content management module 168 are described in greater detail below with reference to FIGS. 3-7.

With continued reference to the content management device 110, the one or more I/O interfaces 156 may facilitate communication between the content management device 110 and one or more input/output devices, for example, one or more user interface devices, such as a display, keypad, mouse, pointing device, control panel, touch screen display, remote control, microphone, speaker, etc., that facilitate user interaction with the content management device 110. In this regard, user commands may be received by the content management device 110. The one or more network interfaces 158 may facilitate connection of the content management device 110 to one or more suitable networks 115 that facilitate communications with customer devices 105A-F, for example, a broadband network or service provider network (e.g., a cable network, a satellite network, etc.), a cellular network, and/or any other suitable wide area network (e.g., the Internet, etc.).

Communications between various components of the system 100 may be facilitated via any number of suitable networks, such as the illustrated networks 115, 130. Certain networks 115 may facilitate communications between remotely situated devices, such as the content management devices 110 and/or various customer devices. Example networks 115 include, but are not limited to, one or more service provider networks (e.g., a cable network, a satellite network, etc.), telecommunication networks, and/or data networks, whether public, private, or a combination thereof, including but not limited to, a wide area network, the Internet, public switched telephone networks, satellite networks, cable networks, cellular networks, and/or any combination thereof and may be wired and/or wireless. Other networks 130 may be suitable user or customer networks that facilitate communication between customer devices at a content consumption location 125. For example, the user networks 130 may facilitate communication between customer devices that are situated within or likely situated within a subscription area. Examples of suitable user networks 130 include, but are not limited to, local area networks, Bluetooth-enabled networks, Wi-Fi enabled networks, home area networks ("HANs"), Zigbee networks, Multimedia over Coax Alliance ("MoCA") networks, radio frequency networks, mesh networks, local wired networks, local wireless networks, etc.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Operational Overview

Figure 2:
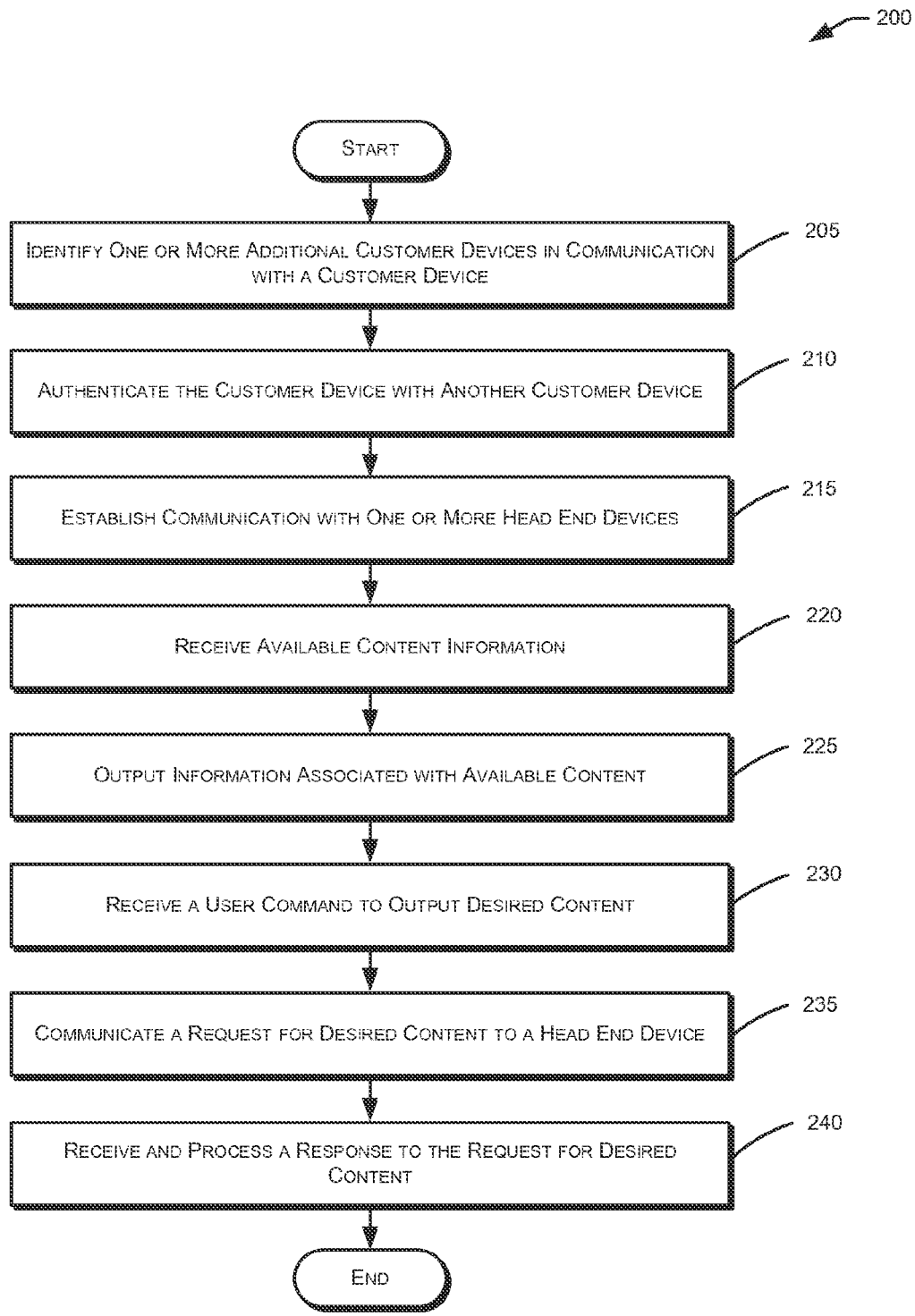
FIG. 2 is a flow diagram of one example method for requesting content by a customer device, according to an illustrative embodiment of the invention.

FIG. 2 is a flow diagram of one example method 200 for requesting content by a customer device, according to an illustrative embodiment of the invention. The method 200 may be performed by any number of suitable customer devices, such as one of the customer devices 105A-F illustrated in FIG. 1. For purposes of explanation, the method 200 is described as being performed by example customer device 105. In certain embodiments, the customer device 105 may be a customer device that has been registered with a content management device and/or other service provider device, such as the content management device 110 illustrated in FIG. 1. In this regard, information associated with the customer device 105 may be stored and maintained by the content management device 110. The method 200 may begin at block 205.

At block 205, the customer device 105 may identify one or more additional customer devices in communication with the customer device 105. A wide variety of different types of additional customer devices may be identified as desired in various embodiments of the invention, including but not limited to authenticated access points, broadband modems, routers, set-top boxes, mobile devices, tablet computers, security systems, energy management systems, personal computers, etc. As desired, a wide variety of suitable networks and/or communication channels, such as the user networks 130 illustrated in FIG. 1, may facilitate communication with and/or identification of one or more additional customer devices.

As desired in various embodiments, a wide variety of information associated with the one or more additional devices may be determined, identified, and/or obtained by the customer device 105. Examples of suitable information associated with the one or more additional devices include, but are not limited to, identifiers of additional devices, IP addresses of the additional devices, other network addresses of the additional devices, information associated with one or more services offered by and/or hosted by the additional information (e.g., Wi-Fi hosting services, Zigbee hosting services, MoCA network management services, security services, etc.), and/or various authentication information (e.g., digital certificates, key information, etc.) received from the additional devices. In certain embodiments, at least a portion of the additional device information may be utilized by the customer device 105 to generate or prepare a mesh fingerprint or mesh profile for the customer device 105. The generated mesh fingerprint may be communicated to a head end device and/or content management device 110 in association with a request for desired content. In other embodiments, at least a portion of the additional device information may be communicated to the head end device and/or content management device 110, and the recipient device may generate or prepare the mesh fingerprint.

At block 210, the customer device 105 may request and/or facilitate authentication with another customer device. For example, the customer device 105 may establish a communications session with another customer device, such as an authenticated access point, and the customer device 105 may communicate authentication information (e.g., a digital certificate, key information, etc.) to the additional customer device. The additional customer device may authenticate the customer device 105 utilizing at least a portion of the received authentication information. For example, received authentication information may be compared to authentication information stored on the additional customer device, such as authentication information previously received from the content management device 110 during a registration of the customer device 105. A wide variety of suitable actions may be taken by the additional customer device in the event that the customer device 105 is authenticated. For example, the additional customer device may communicate an authentication indication to the content management device 110. As another example, an authentication indication or additional authentication information may be communicated to the customer device 105 for provision to the content management device 110 in association with a content request. Regardless of the action taken by the additional customer device, the performed authentication may be utilized by the content management device 110 in a determination as to whether the customer device 105 is situated within or likely situated within a subscription area.

At block 215, the customer device 105 may establish communication with one or more head end devices and/or service provider systems. For example, communication may be established with one or more host modules associated with a content management device 110 or other service provider system. A wide variety of suitable networks and/or connections may facilitate the establishment of a communication session with the content management device 110, such as the networks 115 illustrated in FIG. 1. In certain embodiments, communication may be established through another customer device, such as an authenticated access point (e.g., a broadband modem, a broadband router, etc.). In other embodiments, communication may be established through any number of other devices or, alternatively, direct communication may be established.

At block 220, information associated with available content may be received by the customer device 105. For example, information associated with available television content, video on-demand content, audio content, and/or other content offered by the service provider may be received. A wide variety of suitable techniques may be utilized as desired to receive information associated with available content. For example, one or more Web pages and/or other graphical user interfaces that include available content information may be received. As another example, EPG information may be received. As yet another example, available content information that is processed by a dedicated content application executed by the customer device 105 may be received.

At block 225, information associated with at least a portion of the available content may be output by the customer device 105 for presentation to a customer. For example, one or more graphical user interfaces that include available content information may be output to a display. As another example, EPG information may be utilized to generate an IPG display, such as an IPG grid, and the IPG display may be output for presentation or display to the customer. As yet another example, a dedicated content application may generate one or more available content displays that are output for presentation to the customer. At block 230, a customer or user command to receive and/or output a desired content item may be received by the customer device 105. For example, a customer may navigate through one or more graphical user interfaces or an IPG display, and the customer may select a desired content item to be displayed.

At block 235, a request for the desired content item may be generated and communicated by the customer device 105 to a suitable head end device, such as the content management device 110, via one or more suitable communications sessions and/or network connections. As desired, a wide variety of different types of information may be included in a generated request for desired content, such as an identifier of the customer device 105, identification information and/or access credentials for a customer, an identifier of the desired content item, information associated with communication between the customer device 105 and one or more additional devices (e.g., a mesh fingerprint, IP addresses, additional device identifiers, etc.), and/or authentication information received from an additional device. The content request may be processed by the content management device 110 in order to determine whether the requested content will be provided to the customer device 105 and/or whether the customer device 105 will be permitted to access the desired content (e.g., encrypt the desired content, etc.)

At block 240, one or more responses to the communicated content request may be received by the customer device 105. For example, a response may be received from a content management device 110 via one or more suitable networks 115. A received response may include a wide variety of information associated with the desired content. For example, in the event that the content management device 110 determines that the customer device 105 is authorized to receive the desired content (e.g., the customer device is situated within a subscription area), then the desired content may be received. Alternatively, decryption information for the desired content may be received. As another example, in the event that the content management device 110 determines that the customer device 105 is not authorized to receive the desired content, a suitable message indicating that the desired content is not accessible (e.g., a message indicating that the content is not accessible outside of the subscription area, etc.) may be received. As yet another example, in the event that the content management device 110 determinates that a limited version of the content is accessible (e.g., a lower quality version of the content, a condensed version of the content, etc.), then the restricted or limited version of the content may be received. As yet another example, one or more prompts for authentication information (e.g., user name and password, etc.) may be received. As yet another example, an invitation for the user to purchase rights to the content (e.g., rights outside of the subscription area) may be received.

The received response may be processed by the customer device 105, and information associated with the processing may be output for presentation to the user. For example, received content and/or limited content may be output for presentation. As another example, one or more messages and/or prompts may be output. In certain embodiments, additional customer input, such as information entered in response to one or more prompts, may be received and processed. As desired, additional communications may be generated by the customer device 105 and communicated to the content management device 110. For example, authentication information and/or an acceptance of billing terms may be utilized to generate a message that is communicated to the content management device 110.

The method 200 may end following block 240.

Figure 3:
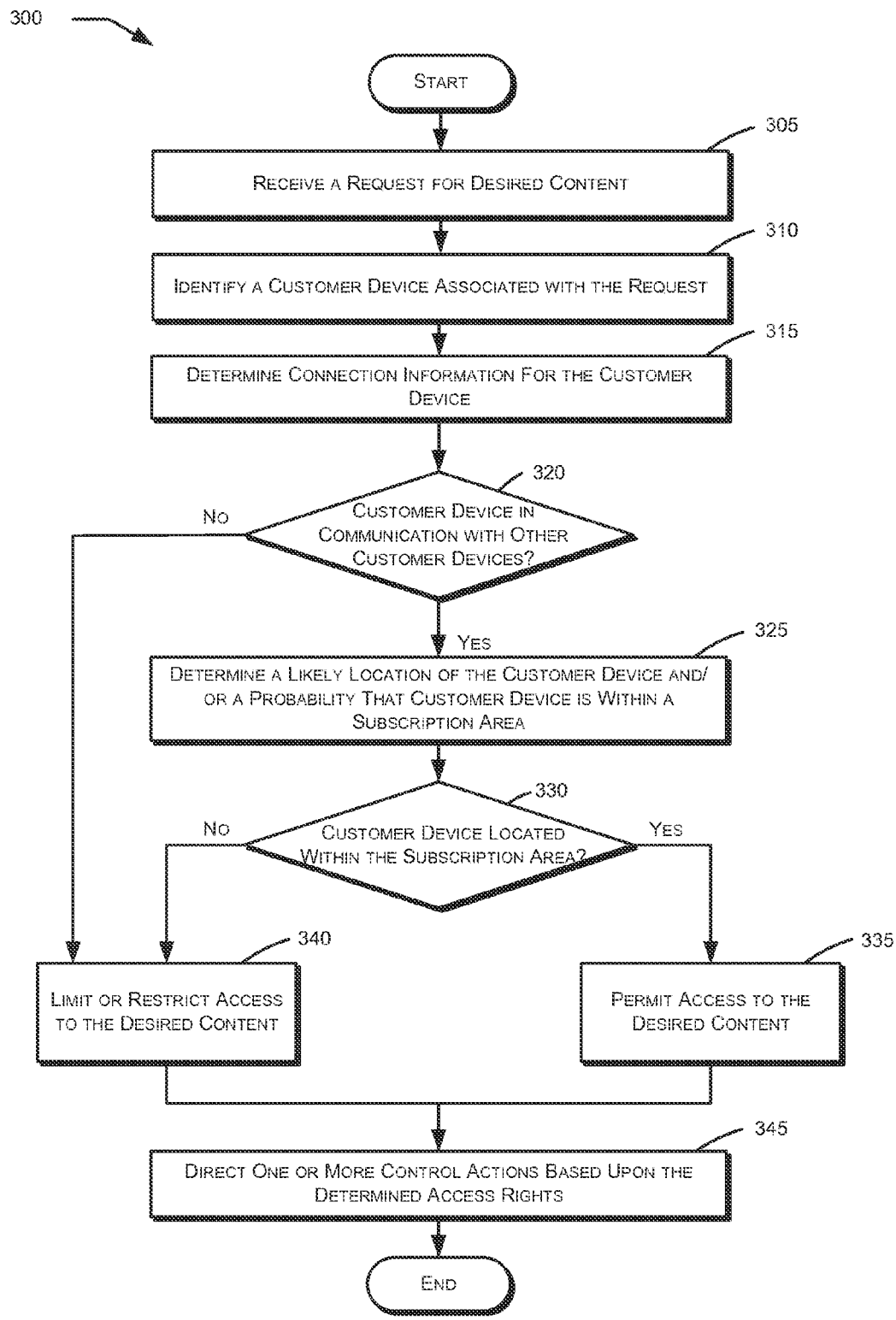
FIG. 3 is a flow diagram of one example method for processing content requests, according to an example embodiment of the invention.

FIG. 3 is a flow diagram of one example method 300 for processing content requests, according to an example embodiment of the invention. The method 300 may be utilized to determine one or more access rights for desired content based at least in part upon a location determination associated with a requesting customer device. In certain embodiments, the operations of the method 300 may be performed by a suitable host module and/or content management module associated with a content management device, such as the host module 166 and/or content management module 168 associated with the content management device 110 illustrated in FIG. 1. The method 300 may begin at block 305.

At block 305, a request for desired content (e.g., a request for a desired content item, etc.) may be received by the content management device 110. The request may be received from a customer device, such as one of the customer devices 105 illustrated in FIG. 1, via a wide variety of suitable networks and/or communication techniques. Additionally, as desired in various embodiments, a wide variety of information may be included in the request, including but not limited to, an identifier of the customer device 105, identification information and/or access credentials for a customer, an identifier of the desired content item, information associated with communication between the customer device 105 and one or more additional devices (e.g., a mesh fingerprint, IP addresses, additional device identifiers, etc.), and/or authentication information received from an additional device.

At block 310, the customer device 105 associated with the received request may be identified. For example, the customer device 105 that generated the content request may be identified. In certain embodiments, a device identifier included in the received request may be evaluated in order to identify the customer device 105. For example, a customer identifier may be compared to stored information associated with customer devices that have been registered with the service provider, and the customer device 105 may be identified based upon a determined correspondence between the customer identifier and at least a portion of the stored information.

At block 315, connection information for the customer device may be determined. A wide variety of different types of connection information may be determined as desired in various embodiments, including but not limited to, information associated with an additional device (e.g., an authenticated access point, etc.) that is being used by the customer device 105 to connect to a service provider head end system and/or information associated with one or more additional devices in communication with the customer device 105. In certain embodiments, connection information may be determined based at least in part upon an analysis of information received from the customer device 105, such as information included in the content request. In other embodiments, connection information may be determined based at least in part upon an analysis of information received from one or more additional devices. For example, one or more additional devices associated with a customer (i.e., a customer associated with the customer device) may be identified based upon an analysis of stored customer device information. In this regard, one or more respective requests for connection information may be communicated to the additional device(s), and responses received from the additional device(s) may be evaluated in order to determine whether the customer device 105 is in communication with any of the additional devices.

At block 320, a determination may be made as to whether the customer device 105 is in communication with one or more additional customer devices. For example, the connection information (e.g., information received from the customer device 105 and/or information received from one or more additional devices) may be evaluated in order to determine whether the customer device 105 is in communication with one or more additional or other customer devices. If it is determined at block 320, that the customer device 105 is not in communication with one or more additional customer devices, then a determination may be made that the customer device 105 is likely not located within a subscription area, and operations may continue at block 340 described in greater detail below. Alternatively, in certain embodiments, additional information associated with the customer device 105 (e.g., a device type, received global positioning system ("GPS") coordinates for the customer device 105, etc.) may be evaluated in order to determine whether the customer device 105 is located within the subscription area, and access rights may be determined based at least in part upon the evaluation.

If, however, it is determined at block 320 that the customer device 105 is in communication with one or more additional or other customer devices, then operations may continue at block 325. At block 325, a subscription area for the customer may be determined. Additionally, a likely location of the customer device 105 and/or a probability that the customer device 105 is located within the subscription area may be determined. A wide variety of suitable techniques may be utilized as desired in order to determine a likely location and/or a location probability (e.g., a probability score, etc.) associated with the customer device 105. A few example techniques include, but are not limited to, determining whether the customer device 105 is connected to the content management device 110 via an authenticated access point, determining whether one or more additional customer devices have authenticated the customer device 105, determining and/or evaluating a mesh fingerprint associated with the customer device 105, and/or evaluating one or more characteristics associated with the customer device 105. These example techniques are described in greater detail below with reference to FIGS. 4-7. However, it will be appreciated that embodiments of the invention are not limited to these example techniques. Additionally, various techniques may be combined together in order to determine a likely location and/or a location probability associated with the customer device 105.

At block 330, a determination may be made as to whether the customer device 105 is located within the subscription area for the customer. For example, a determination may be made as to whether the likely location falls within the subscription area for the customer. As another example, a determination may be made as to whether a calculated probability score satisfies a threshold value associated with a determination that the customer device 105 is located within the subscription area. If it is determined at block 330 that the customer device 105 is located within the subscription area, then operations may continue at block 335. At block 335, access to the desired content may be permitted. For example, access to the content may be permitted in accordance with the customer's subscription plan with the service provider. Operations may then continue at block 345.

If, however, it is determined at block 330 that the customer device 105 is not located within the subscription area, then operations may continue at block 340. At block 340, which may be reached from either block 320 or block 330, access to the desired content may be restricted or limited. In certain embodiments, access may be limited or restricted based at least in part upon a wide variety of preferences, such as preferences of a content provider associated with the desired content and/or preferences of the service provider. A wide variety of restrictions and/or limitations may be utilized as desired in various embodiments of the invention. For example, the determined access rights may indicate that the customer device 105 is not permitted to access the desired content outside of the subscription area. As another example, the determined access rights may indicate that only a limited version of the desired content may be provided, such as a lower quality and/or lower resolution version of the desired content, a condensed and/or shortened version of the content, or a preview of the content. As yet another example, the determined access rights may specify that additional authentication credentials (e.g., a user name and password, etc.) are required when the customer device 105 is located outside of the subscription area. As other examples, the determined access rights may specify that one or more advertisements and/or commercials will be added to desired content and/or that the customer will be invited to pay for access to the desired content outside of the subscription area (e.g., an upgrade to a subscription plan, a one time purchase, etc.). Following the determination of access rights at block 340, operations may continue at block 345.

At block 345, which may be reached from either block 335 or block 340, one or more control actions may be taken based at least in part upon the determined access rights. For example, if the determined access rights permit access to the desired content, then the desired content may be communicated to the customer device 105. Additionally or alternatively, decryption information and/or access information may be communicated to the customer device 105.

As another example, if the determined access rights indicate that access will not be permitted, then a suitable message may be generated to indicate that access to the content is prohibited or limited on the customer device 105 while the customer device 105 is located outside of the subscription area. As desired, a message may invite the customer to purchase access rights to the desired content. The generated message(s) may then be communicated to the customer device 105. As yet another example, if the determined access rights indicate that access will be limited, then a limited version of the desired content may be output for communication to the customer device 105. As desired, the customer may be invited to purchase access rights to the full version of the desired content.

As yet another example, if the determined access rights require additional authentication, then a prompt for the additional authentication may be generated and communicated to the customer device 105. A response that includes requested authentication information may then be received from the customer device 105 and evaluated in order to determine whether access to the desired content will be permitted. In this regard, the service provider and/or content provider may track and/or control access to content for devices located outside of a subscription area. Additionally, in certain embodiments, a customer may control access to various types of content for devices located outside of a subscription area. For example, parental controls may be handled differently for customer devices located within the subscription area and customer devices located outside of the subscription area. Indeed, a wide variety of different types of access rights and associated control actions may be utilized as desired in various embodiments of the invention.

The method 300 may end following block 345.

Figure 4:
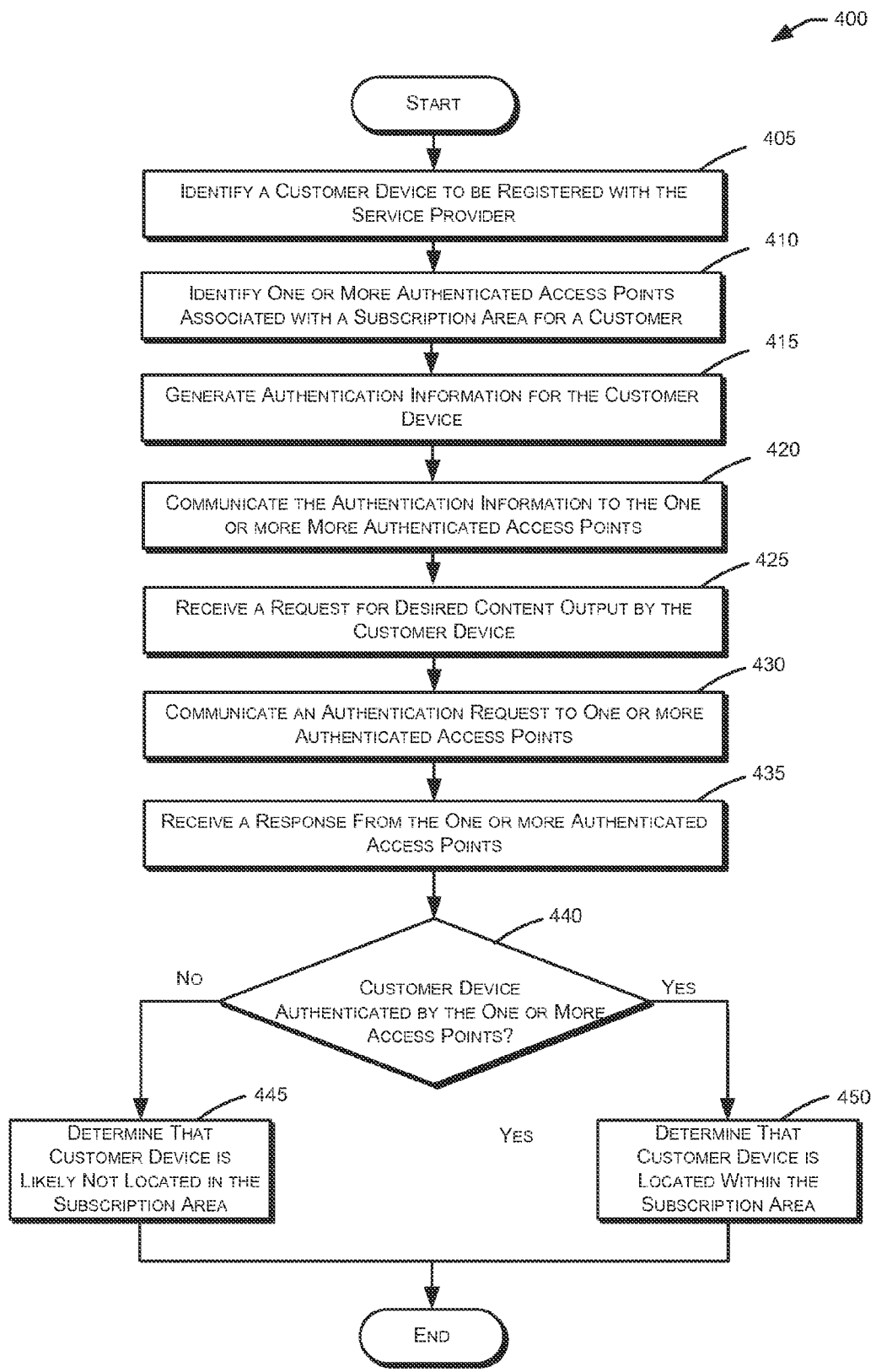
FIG. 4 is a flow diagram of one example method for determining whether a customer device is located within a subscription area, according to an example embodiment of the invention.

FIG. 4 is a flow diagram of one example method 400 for determining whether a customer device is located within a subscription area, according to an example embodiment of the invention. The method 400 may be utilized, for example, to determine whether a customer device is connected to a service provider system via one or more authenticated access points. In certain embodiments, the operations of the method 400 may be performed by a suitable content management module associated with a content management device, such as the content management module 168 associated with the content management device 110 illustrated in FIG. 1. The method 400 may begin at block 405.

At block 405, a customer device, such as the customer device 105 illustrated in FIG. 1, may be identified for registration with a service provider. During the registration, a wide variety of information associated with the customer device 105 may be identified and stored by the service provider. Examples of suitable information that may be identified and stored include, but are not limited to, device identification information, device characteristics (e.g., a device type, etc.), device capabilities, and/or information associated with a customer or customer account that is associated with the customer device 105.

Additionally, in certain embodiments, information associated with one or more additional customer devices for the customer may be identified and stored. For example, at block 410, one or more authenticated access points associated with the customer may be identified. In certain embodiments, the identified one or more authenticated access points may be situated within a subscription area of the customer. A wide variety of different types of authenticated access points associated with the customer may be identified, such as broadband modems, set-top boxes, and/or gateway devices. Additionally, a wide variety of information associated with an authenticated access point may be identified as desired, such as an identifier of the authenticated access point and/or capabilities of the authenticated access point.

At block 415, authentication information for the customer device 105 may be generated by the content management module 168. A wide variety of authentication information for the customer device 105 may be generated as desired in various embodiments of the invention. Examples of suitable authentication information include, but are not limited to, digital certificate information, key information, and/or information that may be utilized to generate dynamic key information. As desired, different authentication information may be generated for communication to different authenticated access points.

At block 420, at least a portion of the generated authentication information may be communicated to the one or more authenticated access points. Additionally, corresponding authentication information (e.g., a portion of a key pair, digital certificate information, information utilized to generate dynamic key information, etc.) may be communicated to the customer device 105. In this regard, the customer device 105 may establish communication with one or more of the authenticated access points and be authenticated by the authenticated access points. For example, when the customer device 105 is located within a subscription area, the customer device 105 may establish communication with an authenticated access point. The authenticated access point may then conduct an authentication process with the customer device 105 utilizing at least a portion of the authentication information.

Following the communication of authentication information to one or more authenticated access points, operations may continue at block 425. At block 425, a request for desired content may be received. The content request may be output by a customer device 105 and communicated to the service provider system via any number of suitable networks, such as the networks 115 illustrated in FIG. 1. As desired, a wide variety of information may be included in the request, including but not limited to, an identifier of the customer device 105, identification information and/or access credentials for a customer, an identifier of the desired content, information associated with communication between the customer device 105 and one or more additional devices (e.g., a mesh fingerprint, IP addresses, additional device identifiers, etc.), and/or authentication information received from an authenticated access point.

At block 430, the one or more authenticated access points associated with the customer device 105 may be identified, and a respective authentication request may be generated and communicated to each of the identified one or more authenticated access points. For example, stored information associated with the customer device 105 may be evaluated in order to identify the one or more authenticated access points. A respective request to verify that the customer device 105 has been authenticated by an authenticated access point may then be generated and communicated to each authenticated access point. At block 435, one or more responses to the authentication requests may be received from the one or more authenticated access points. Each received response may include an indication of whether or not the customer device 105 has been authenticated by the relevant authenticated access point.

At block 440, a determination may be made as to whether the customer device 105 has been authenticated by one or more of the authenticated access points. For example, the responses received from the authenticated access points may be evaluated in order to determine whether the customer device 105 has been authenticated. As an alternative to communicating an authentication request to an authenticated access point and evaluating a response, information received from the customer device 105 may be evaluated in order to determine whether the customer device 105 has been authenticated by an authenticated access point. For example, authentication information may be received by the customer device 105 from an authenticated access point, and the received authentication information may be communicated to the service provider system in association with the content request. The content management module 168 may evaluate the authentication information in order to determine whether the customer device 105 has been authenticated by one or more authenticated access points.

If it is determined at block 440 that the customer device 105 has not been authenticated by one or more authenticated access points, then operations may continue at block 445. At block 445, it may be determined that the customer device 105 is likely not located within a subscription area for the customer because the customer device 105 has not been authenticated by other devices located within the subscription area. Alternatively, at block 445, a probability that the customer device 105 is located in the subscription area may be lowered or determined to be lower. A wide variety of suitable access rights may be determined and/or a wide variety of suitable control actions may then be taken as described in greater detail above with reference to blocks 340 and 345 of FIG. 3.

If, however, it is determined at block 440 that the customer device 105 has been authenticated by one or more authenticated access points, then operations may continue at block 450. At block 450, it may be determined that the customer device 105 is likely located within a subscription area for the customer because the customer device 105 has been authenticated by other devices located within the subscription area. Alternatively, at block 450, a probability that the customer device 105 is located in the subscription area may be increased or determined to be higher. A wide variety of suitable access rights may be determined and/or a wide variety of suitable control actions may then be taken as described in greater detail above with reference to blocks 335 and 345 of FIG. 3.

The method 400 may end following either block 445 or block 450.

Figure 5:
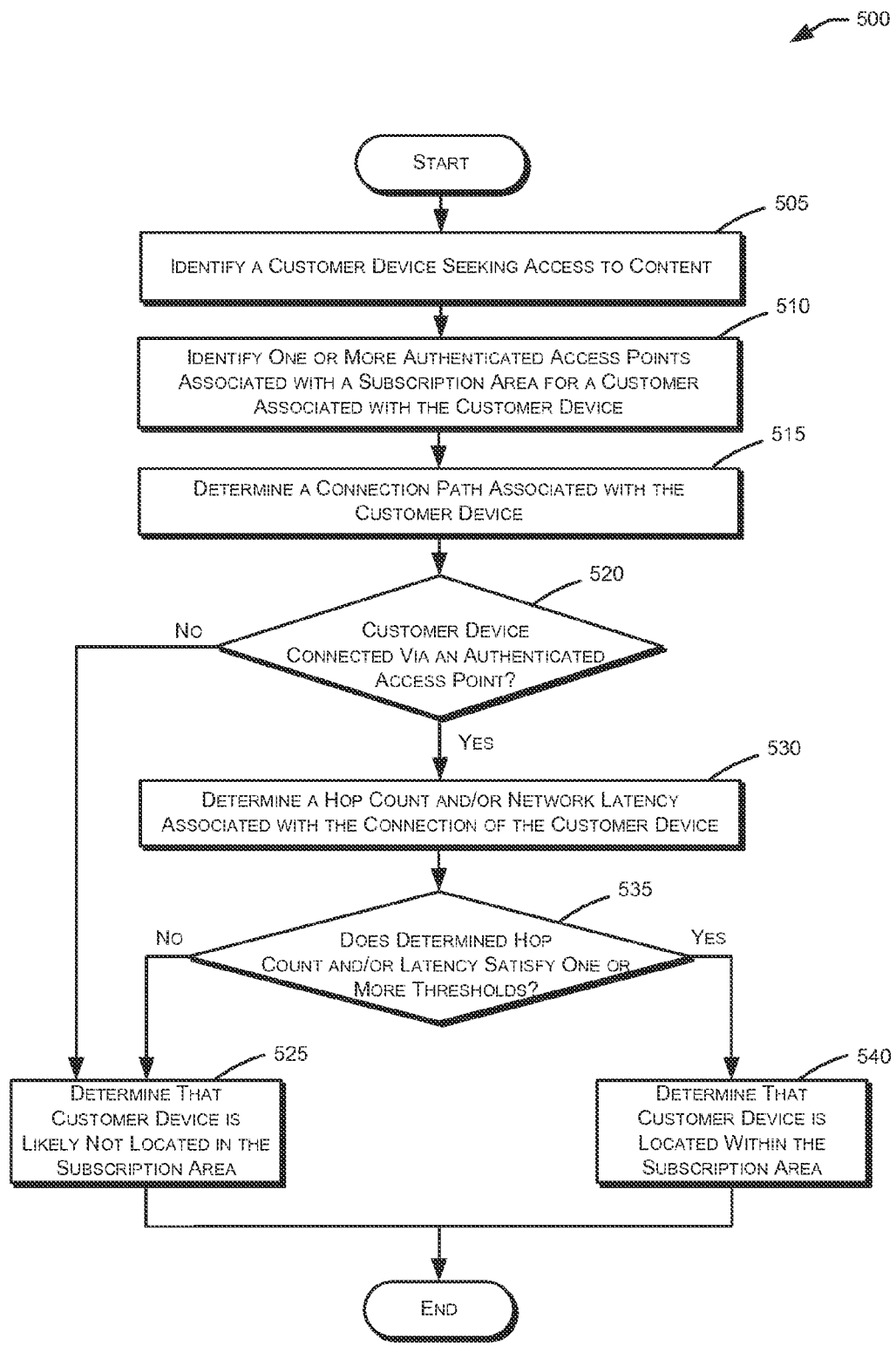
FIG. 5 is a flow diagram of another example method for determining whether a customer device is located within a subscription area, according to an example embodiment of the invention.

FIG. 5 is a flow diagram of another example method 500 for determining whether a customer device is located within a subscription area, according to an example embodiment of the invention. The method 500 may be utilized, for example, to determine whether a customer device is authenticated by another customer device. In certain embodiments, the operations of the method 500 may be performed by a suitable content management module associated with a content management device, such as the content management module 168 associated with the content management device 110 illustrated in FIG. 1. The method 500 may begin at block 505.

At block 505, a customer device seeking access to desired content, such as the customer device 105 illustrated in FIG. 1, may be identified. For example, a customer device identifier included in a request for desired content may be identified. The identifier may then be compared to stored device identification information, such as information stored during the registration of one or more customer devices, and the customer device 105 may be identified based at least in part upon a determined correspondence.

Additionally, at block 510, one or more authenticated access points associated with the customer may be identified. In certain embodiments, the identified one or more authenticated access points may be situated within a subscription area of the customer. A wide variety of different types of authenticated access points associated with the customer may be identified, such as broadband modems, set-top boxes, and/or gateway devices. Additionally, a wide variety of information associated with an authenticated access point may be identified as desired, such as an identifier of the authenticated access point and/or capabilities of the authenticated access point.

At block 515, a connection path associated with the identified customer device 105 may be determined. For example, a connection path that facilitates the establishment of a communications session between the customer device 105 and the service provider system may be identified. The connection path may include information associated with any number of nodes that facilitate connection of the customer device 105. At block 520, a determination may be made as to whether the customer device 105 is connected to the service provider system via or through an authenticated access point. For example, a determination may be made as to whether an authenticated access point is included in the connection path for the customer device 105. If it is determined at block 520 that the customer device 105 is not connected via an authenticated access point, then operations may continue at block 525. At block 525, it may be determined that the customer device 105 is likely not located within a subscription area for the customer. Alternatively, at block 525, a probability that the customer device 105 is located within the subscription area may be lowered or determined to be lower. A wide variety of suitable access rights may be determined and/or a wide variety of suitable control actions may then be taken as described in greater detail above with reference to blocks 340 and 345 of FIG. 3.

If, however, it is determined at block 520 that the customer device 105 is connected via an authenticated access point, then operations may continue at block 530. At block 530, a hop count and/or a network latency associated with the connection of the customer device 105 to the authenticated access point and/or service provider system may be determined or identified. A hop count may identify a number of connection points, such as routers and/or other devices, that facilitate a connection between the customer device 105 and a host device (e.g., an authenticated access point, a service provider system, etc.). A latency may identify a time delay for a connection between the customer device 105 and a host device.

At block 535, a determination may be made as to whether the determined hop count and/or latency satisfy one or more thresholds. In this regard, a determination may be made as to whether the customer device 105 is likely located within the subscription area or whether a customer is attempting to establish a remote connection (e.g., tunneling, etc.) between the customer device 105 and the authenticated access point. For example, a determination may be made as to whether a hop count between the customer device 105 and the authenticated access point is less than or equal to a hop count threshold indicating that the customer device 105 is located within the subscription area. As another example, a determination may be made as to whether a latency between the customer device 105 and the authenticated access point is less than or equal to a latency threshold indicating that the customer device 105 is located within the subscription area. As another example, a hop count or latency between the authenticated access point and the service provider system may be determined, and the authenticated access point hop count or latency may be utilized in conjunction with a hop count or latency between the customer device 105 and the service provider system to determine an estimated or likely hop count or latency between the customer device 105 and the authenticated access point. The determined or calculated hop count or latency may then be compared to one or more thresholds.

If it is determined at block 535 that the one or more thresholds have not been satisfied, then operations may continue at block 525 described in greater detail above. If, however, it is determined at block 535 that the one or more thresholds have been satisfied, then operations may continue at block 540. At block 540, it may be determined that the customer device 105 is likely located within a subscription area for the customer. Alternatively, at block 540, a probability that the customer device 105 is located within the subscription area may be increased or determined to be higher. A wide variety of suitable access rights may then be determined and/or a wide variety of suitable control actions may then be taken as described in greater detail above with reference to blocks 335 and 345 of FIG. 3.

The method 500 may end following either block 525 or block 540.

Figure 6:
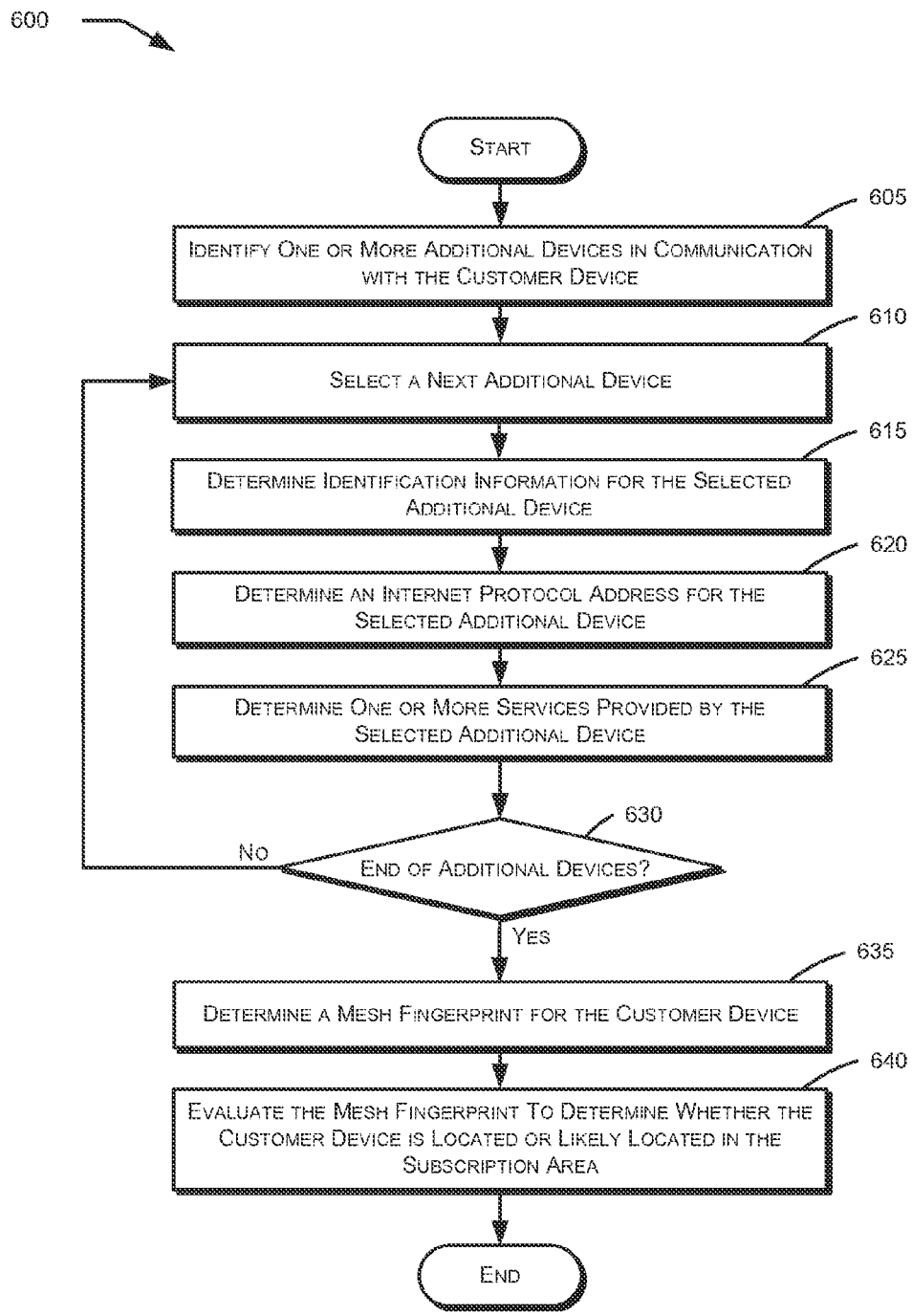
FIG. 6 is a flow diagram of another example method for determining whether a customer device is located within a subscription area, according to an example embodiment of the invention.

FIG. 6 is a flow diagram of another example method 600 for determining whether a customer device is located within a subscription area, according to an example embodiment of the invention. The method 600 may be utilized, for example, to determine a likely location of a customer device based at least in part upon a mesh fingerprint. In certain embodiments, the operations of the method 600 may be performed by a suitable content management module associated with a content management device, such as the content management module 168 associated with the content management device 110 illustrated in FIG. 1. Additionally, in certain embodiments, the method 600 may be performed based at least in part upon an identified communications session established between a customer device, such as the customer device 105 illustrated in FIG. 1, and a service and/or based upon the receipt of a request for desired content. The method 600 may begin at block 605.

At block 605, one or more additional devices in communication with the customer device 105 may be identified. A wide variety of different types of additional customer devices may be identified as desired in various embodiments of the invention, including but not limited to, authenticated access points, broadband modems, routers, set-top boxes, mobile devices, tablet computers, security systems, energy management systems, personal computers, etc. Additionally, as desired in various embodiments, a wide variety of information associated with the one or more additional devices may be received. Examples of suitable information associated with the one or more additional devices include, but are not limited to, identifiers of additional devices, IP addresses of the additional devices, other network addresses of the additional devices, information associated with one or more services offered by and/or hosted by the additional information (e.g., Wi-Fi hosting services, Zigbee hosting services, MoCA network management services, security services, etc.), and/or various authentication information (e.g., digital certificates, key information, etc.). As desired, the information associated with one or more additional devices may be received from the customer device 105 and/or from any number of the additional devices.

At block 610, a next additional device may be selected for processing and evaluation. During the processing and evaluation, a wide variety of information associated with the selected additional device may be determined from received information, accessed from stored information associated with the selected additional device, and/or obtained from the selected additional device. For example, at block 615, identification information for the selected additional device may be determined, such as a device name and/or a device identifier. At block 620, an IP address for the selected additional device may be determined. At block 625, one or more services provided or offered by the selected additional device (e.g., functions performed by the additional device, services hosted by the additional device, etc.) may be determined. A wide variety of different services may be identified as desired in various embodiments of the invention, and characteristics associated with the services may be determined. For example, it may be determined that a router device provides content distribution and/or access services via one or more networks. Additionally, it may be determined that these services are likely provided within a specified range associated with the router device. As another example, it may be determined that a security device provides security services for a household or other location.

At block 630, a determination may be made as to whether the end of the identified additional devices has been reached. If it is determined at block 630 that the end of the identified additional devices has not been reached, then operations may continue at block 610 described above, and a next additional device may be selected for processing and evaluation. If, however, it is determined at block 630 that the end of the identified additional devices has been reached, then operations may continue at block 635.

At block 635, a mesh fingerprint or mesh profile for the customer device 105 may be determined. The mesh fingerprint may include a wide variety of information associated with any number of additional devices in communication with the customer device 105, such as a portion or all of the information determined at blocks 615, 620, and 625. In addition to or as an alternative to the content management module 168 determining a mesh fingerprint, a mesh fingerprint may be determined by the customer device 105 and communicated by the customer device 105 to the service provider system. As desired, the received mesh fingerprint may be evaluated and/or verified by the content management module 168. For example, the content management module 168 may independently generate a mesh fingerprint, and the mesh fingerprint generated by the content management module 168 may be compared to the received mesh fingerprint. As another example, the content management module 168 may communicate with one or more of the additional devices identified in a received mesh fingerprint in order to verify a portion or all of the received mesh fingerprint.

At block 640, the mesh fingerprint may be evaluated in order to determine whether the customer device is located within or likely located within the subscription area for the customer. Alternatively, the mesh fingerprint may be evaluated in order to determine a probability that the customer device 105 is located within the subscription area. A wide variety of suitable evaluation and/or analysis may be performed on the mesh fingerprint as desired in various embodiments of the invention. For example, the services provided by the additional devices may be evaluated in order to determine whether the services are likely provided within the subscription area. As another example, characteristics of the additional devices may be evaluated in order to determine whether the additional devices are devices that are generally located within the subscription area. In this regard, based at least in part upon an evaluation of the additional devices, a determination may be made as to whether the customer device 105 is located within the subscription area. For example, if the customer device 105 is in communication with a security system and/or a broadband modem, a determination may be made that the customer device 105 is likely located within the subscription area. As another example, if the customer device 105 is only in communication with a mobile device and/or a tablet computer, then a determination may be made that the customer device 105 is likely located outside of the subscription area.

The method 600 may end following block 640.

Figure 7:
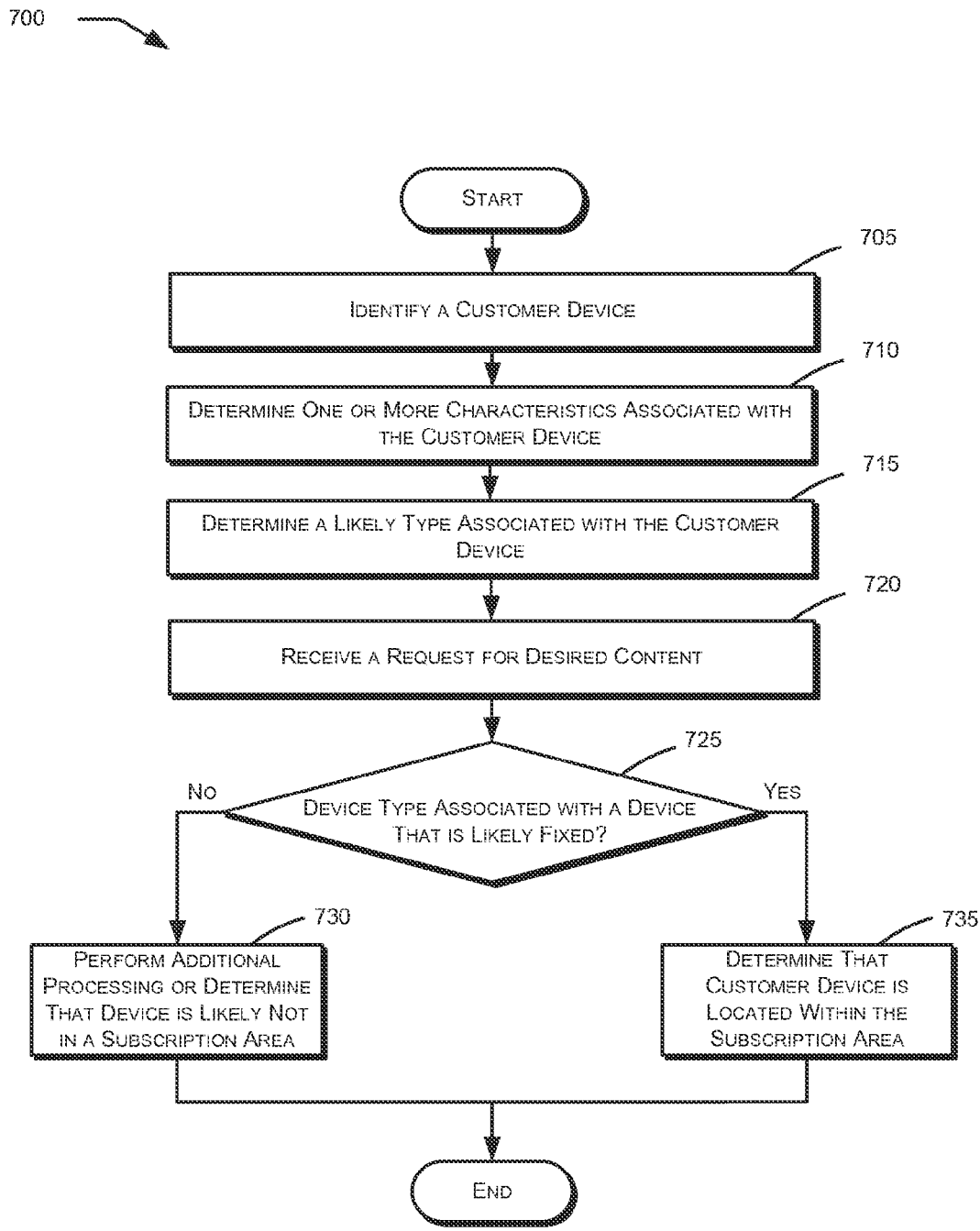
FIG. 7 is a flow diagram of another example method for determining whether a customer device is located within a subscription area, according to an example embodiment of the invention.

FIG. 7 is a flow diagram of another example method 700 for determining whether a customer device is located within a subscription area, according to an example embodiment of the invention. The method 700 may be utilized, for example, to evaluate one or more characteristics of a customer device in order to determine whether the customer device is likely located within a subscription area. In certain embodiments, the operations of the method 700 may be performed by a suitable content management module associated with a content management device, such as the content management module 168 associated with the content management device 110 illustrated in FIG. 1. The method 700 may begin at block 705.

At block 705, a customer device, such as the customer device 105 illustrated in FIG. 1, may be identified. For example, customer device identification information (e.g., a device identifier, a device name, a device type, etc.) included in a request to register the customer device 105 with a service provider system may be identified. At block 710, one or more characteristics associated with the customer device 105 may be identified and/or determined, such as a model type associated with the customer device 105 and/or one or more functions of the customer device 105. The characteristics may be determined based upon information received from the customer device 105 and/or based upon information received from one or more other sources, such as a device manufacturer and/or any number of suitable databases.

At block 715, a likely type associated with the customer device 105 may be determined or identified. According to an aspect of the invention, the determined type may be associated with whether the customer device 105 is likely a fixed device or a portable device. For example, a personal desktop computer may be identified as a device that is likely fixed. As another example, a mobile device or tablet computer may be identified as a device that is likely portable. As desired, a wide variety of device information and/or characteristics may be evaluated as desired in order to determine a likely type associated with the customer device 105. For example, a model number associated with a personal computer may be evaluated in order to identify the personal computer as a desktop computer.

At block 720, a request for desired content may be received from the customer device 105 via a suitable communications session. The request may include a suitable device identifier that is utilized to identify the customer device 105. A determination may then be made at block 725 as to whether the customer device 105 is a device that is likely a fixed device. For example, stored device type information may be accessed and evaluated. As another example, one or more device characteristics may be identified and evaluated in order to determine a likely device type in a manner similar to that described above with reference to block 715.

If it is determined at block 725 that the device type for the customer device 105 is not associated with a device that is likely fixed, then operations may continue at block 730. At block 730, it may be determined that the customer device 105 is likely not located within a subscription area for the customer or that additional evaluation of the customer device 105 is desired. Alternatively, at block 730, a probability that the customer device 105 is located within the subscription area may be lowered or determined to be lower. A wide variety of suitable access rights may be determined and/or a wide variety of suitable control actions may then be taken as described in greater detail above with reference to blocks 340 and 345 of FIG. 3.

If, however, it is determined at block 725 that the device type for the customer device 105 is associated with a device that is likely fixed, then operations may continue at block 735. At block 735, it may be determined that the customer device 105 is likely located within a subscription area for the customer. Alternatively, at block 735, a probability that the customer device 105 is located within the subscription area may be increased or determined to be higher. A wide variety of suitable access rights may be determined and/or a wide variety of suitable control actions may then be taken as described in greater detail above with reference to blocks 335 and 345 of FIG. 3.

The method 700 may end following either block 730 or block 735.

The operations described and shown in the methods 200, 300, 400, 500, 600, and 700 of FIGS. 2-7 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-7 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    identifying, by a customer device having at least one processor and at least one memory device, a second customer device by determining device information comprising an identifier, a network address, information associated with a service offered by the second customer device, and authentication information;
    establishing, by the customer device, a communication session with the second customer device;
    generating a mesh profile based on at least a portion of the determined device information for the second customer device;
    determining that the customer device is located within a content subscription area based on the mesh profile;
    communicating, by the customer device, the authentication information to the second customer device;
    receiving, by the customer device, an authentication indication from the second customer device;
    establishing, by the customer device, a communication with one or more head-end devices;
    executing a content application by the customer device; and
    receiving, by the customer device, information associated with available content via the content application.

2. The method of claim 1, further comprising outputting the information associated with the available content by the customer device via the content application.

3. The method of claim 1, further comprising communicating, by the customer device, a request for specific available content to a head-end device of the one or more head-end devices.

4. The method of claim 3, wherein the communicating comprises communicating, by the customer device, at least one of an identifier of the customer device, an identifier of the desired content, or the mesh profile to the head-end device.

5. The method of claim 3, further comprising receiving a response to the request for the specific available content, and processing the response.

6. The method of claim 5, wherein receiving the response comprises receiving at least one of the specific available content, decryption information for the specific available content, a message indicating that the specific available content is not accessible outside a subscription area, or a restricted version of the specific available content.

7. The method of claim 5, wherein processing the response comprises prompting for authentication information, or prompting for a purchase of the rights to the content outside a subscription area.

8. A customer device, comprising:
    at least one memory device having instructions encoded thereon; and
    at least one processor coupled to the at least one memory and configured, by the instructions, to:
        identify, by the customer device, a second customer device by determining device information comprising an identifier, a network address, information associated with a service offered by the second customer device, and authentication information;
        establish a communication session with the second customer device;
        generate a mesh profile based on at least a portion of the determined device information for the second customer device;
        determine that the customer device is located within a content subscription area based on the mesh profile;
        communicate the authentication information to the second customer device;
        receive an authentication indication from the second customer device;
        establish a communication with one or more head-end devices;
        execute a content application by the customer device; and
        receive information associated with available content via the content application.

9. The device of claim 8, wherein the at least one processor is further configured, by the instructions, to output the information associated with the available content via the content application.

10. The device of claim 8, wherein the at least one processor is further configured, by the instructions, to communicate a request for specific available content to a head-end device of the one or more head-end devices.

11. The device of claim 10, wherein the at least one processor is further configured, by the instructions, to communicate at least one of an identifier of the customer device, an identifier of the desired content, or the mesh profile to the head-end device.

12. The device of claim 10, wherein the at least one processor is further configured, by the instructions, to receive a response to the request for the specific available content, and to process the response.

13. The device of claim 12, wherein the at least one processor is further configured, by the instructions, to receive at least one of the specific available content, decryption information for the specific available content, a message indicating that the specific available content is not accessible outside a subscription area, or a restricted version of the specific available content.

14. The device of claim 12, wherein the at least one processor is further configured, by the instructions, to present a prompt for authentication information, or to present a prompt for a purchase of the rights to the content outside a subscription area.

15. At least one computer-readable non-transitory storage medium having instructions encoded thereon that, in response to execution, cause at least one processor to perform operations comprising:

identifying, by a first customer device, a second customer device, the second customer device being identified by determining device information comprising an identifier, a network address, information associated with a service offered by the second customer device, and authentication information;

generating a mesh profile based on at least a portion of the determined device information for the second customer device;

determining that the customer device is located within a content subscription area based on the mesh profile;

establishing a communication session with the second customer device;

communicating the authentication information to the second customer device;

receiving an authentication indication from the second customer device;

establishing a communication with one or more head-end devices;

executing a content application by the first customer device; and receiving information associated with available content via the content application.

16. The at least one computer-readable non-transitory storage medium of claim 15, the operations further comprising outputting the information associated with the available content via the content application.

* * * * *